Figure 1:
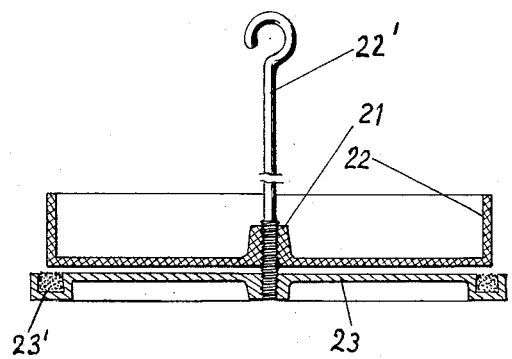

Feb. 3, 1959          G. GHEZZI          2,871,696

WEIGH PAN FOR USE IN INFRA-RED DRYING

Filed Feb. 17, 1955

INVENTOR.
G. Ghezzi
BY Richards y Geier
ATTORNEYS

United States Patent Office 2,871,696
Patented Feb. 3, 1959

2,871,696

WEIGH PAN FOR USE IN INFRA-RED DRYING

Giovanni Ghezzi, Lecce, Italy

Application February 17, 1955, Serial No. 488,774

1 Claim. (Cl. 73—76)

This invention relates to a weigh pan and refers more particularly to a weight pan for use in infra-red drying to determine the moisture content of materials.

An object of the present invention is to provide a weigh pan of the described type which can be used both in an open condition and when hermetically closed.

Other objects of the present invention will become apparent in the course of the following specification:

The objects of the present invention may be realized through the provision of a weigh pan having a central portion adapted for detachable connection to the lower end of a rod, the pan being provided with a cover which may be attached to the rod selectively above or below the pan during weighing.

The invention will appear more clearly from the following detailed description when taken in connection with the accompanying drawing showing, by way of example, a preferred embodiment of the inventive idea.

Figure 2:
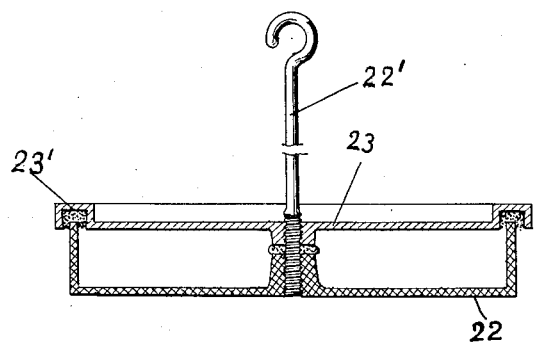

In the drawing:

Figures 1 and 2 represent the weigh pan in two different conditions of use, in section.

The weigh pan shown in the drawing includes a pan 22 provided in the center with a tapered stud 21 containing a threaded opening. A cover 23 has a threaded hole in the center and peripheral grooves 23' which are adapted to fit over the edges of the pan 22 to provide an air-tight seal.

The device is carried by a rod 22' which is attached to one end of a balance, while the other end of the balance carries the usual weights.

The operation is as follows:

When the pan is used to carry the material which is to be dried, the material is placed in the open pan in the position shown in Figure 1. On the other hand, after the material contained in the pan 22 has been dried and it is necessary to prevent it from re-absorbing moisture, then the cover 23 is placed above the pan 22 in the position indicated in Figure 2.

It is apparent that the cover 23 is present in both positions, either above the pan 22 or below the pan, so that the weight is balanced when the device is to be weighed.

A preferred method of procedure is to fill the pan 22 with the material while it is in the position shown in Figure 1 and then weigh it. Thereupon, the material is subject to the action of an infra-red lamp for a predetermined drying period. Thereupon, the cover 23 is placed over the pan 22 and is screwed down until an air-tight seal is provided, as indicated diagrammatically in Figure 2. Then the weigh pan is weighed again and thus the extent of moisture which was present in the material can be conveniently determined.

It is apparent that the examples shown above have been given solely by way of illustration and not by way of limitation and escapable of various modifications.

What I claim is:

A weigh pan for use in infra-red drying to determine the moisture content of materials, comprising a rod, a pan having circumferential upturned rim and a central portion adapted for detachable connection to the lower end of said rod, and a cover for said pan, said cover having grooves fitting substantially air-tightly over said rim of the pan, said cover further having a central aperture adapted to permit passage of the lower end of said rod therethrough, whereby said cover may be attached to said rod selectively above or below said pan during weighing.

References Cited in the file of this patent

UNITED STATES PATENTS

| | | |
|---|---|---|
| 2,667,064 | Anderson et al. | Jan. 26, 1954 |
| 2,709,914 | Bradender et al. | June 7, 1955 |

FOREIGN PATENTS

| | | |
|---|---|---|
| 700,167 | France | Dec. 22, 1930 |
| 987,207 | France | Apr. 11, 1951 |
| 913,591 | Germany | June 18, 1954 |
| 718,444 | Great Britain | Nov. 17, 1954 |